3,159,005
INSULATION SYSTEM FOR LOW
TEMPERATURE SERVICE
Edwin E. Reed and Frederick A. Prange, Bartlesville, Okla., assignors to Phillips Petroleum Company, a corporation of Delaware
Filed June 6, 1962, Ser. No. 200,443
2 Claims. (Cl. 62—45)

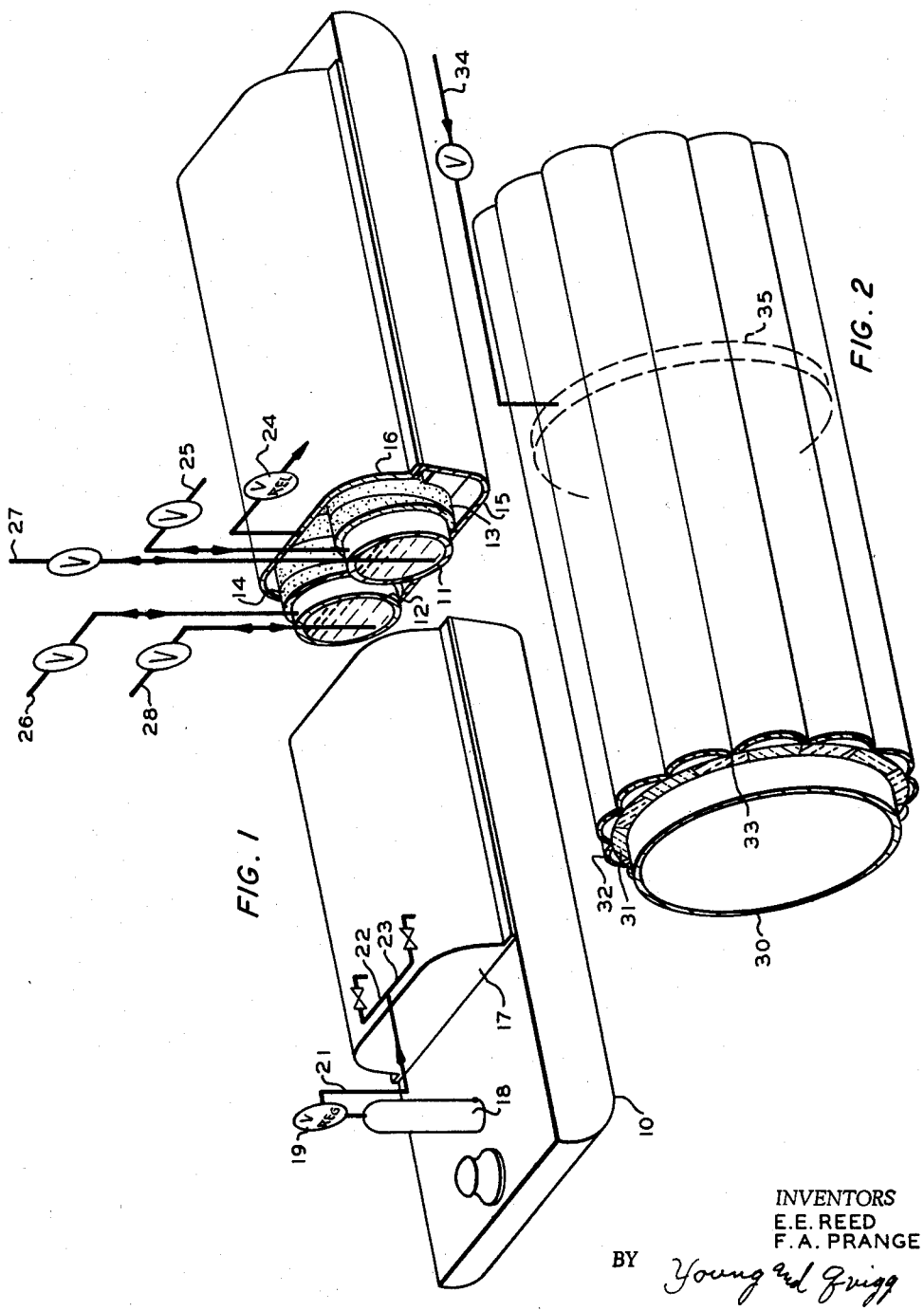

This invention relates to insulated containers for low temperature service. In one aspect this invention relates to a means for avoiding entrance of the moisture of the atmosphere into the insulation around a vessel containing a liquefied gas.

Insulation used for low temperature service is subject to several problems. Moisture which penetrates the weather coat of a system subjected to the weather can water-log porous insulation. Insulation which is impervious to moisture is subject to moisture damage as water enters the joints. Ice can disrupt the insulation, particularly in the case of brittle insulating materials. When liquefied gases, such as liquefied petroleum gases, are transported by barge, an additional problem is that of maintaining a nonexplosive atmosphere.

Various proposals have been considered for protecting the insulation from moisture and thereby protecting the containers from corrosion. Such proposals have included placing the insulation on the inside of the container or passing vapors evolved from the liquified gases through the insulation to prevent entry of atmospheric air. Placing the insulation on the inside of the container does not solve the problem because the container surface will usually be colder than the surrounding atmosphere and when the surface temperature drops below the dew point of the ambient air, sweating occurs with the attendant corrosion problem introduced thereby.

The passage of gas or vapor, evolved from the liquid being refrigerated, through the insulation has been found to be unsatisfactory because variations in the flow of gas allow "breathing" or periodic entrance of atmospheric air with concomitant condensation of moisture and freezing of the condensed moisture because the evolved vapors are cold. Such procedure also places an undesirable load on the refrigeration system because the vapors are warmed considerably in the passage through the insulation. Furthermore, if the refrigerated liquid is a hydrocarbon or other combustible material, the evolved vapors present an additional fire or explosion hazard.

It is therefore an object of this invention to provide a means for preventing access of atmospheric air to the insulation around a vessel wherein the temperature is maintained below the dew point of the ambient air. A further object of the invention is to provide a means for maintaining a positive pressure of dry, inert gas on the insulation around a vessel wherein the temperature is maintained below the dew point of the ambient air. Other objects, advantages and features of the invention will be obvious to one skilled in the art upon study of this disclosure including a detailed description of the invention and the appended drawing wherein:

FIGURE 1 is a perspective view, partly in section, of a barge having the invention incorporated therein; and
FIGURE 2 is a perspective view, partly in section, of a modification of the invention illustrated in FIGURE 1.

Broadly, the invention contemplates enclosing the insulated container, which is maintained at a temperature below the dew point of the ambient air, in a gas impervious shell, filling the space between the container and the shell with a substantially dry, inert gas and maintaining the gas in the confined space at a pressure somewhat above that of the ambient air. The transporting container, e.g., barge, truck, railway car and the like, can supply the outer casing which should be substantially, but not necessarily completely, gas tight so that a relatively small volume of bone-dry or substantially dry gas will be required to maintain a positive pressure in the annulus occupied by the insulation. Alternatively, the vessel containing the refrigerated liquid and its outside layer of solid insulation can be enclosed in a flexible, gas-impervious membrane which is preferably attached to the solid insulation at selected points so as to provide passageways for the bone-dry gas which is utilized to occupy the space between the membrane and the insulation at a pressure somewhat above that of the atmosphere.

The substantially anhydrous or bone-dry gas used to shield the insulation from the atmosphere can be supplied from cylinders and should be as dry as economically possible to avoid a gradual build-up of the moisture content of the insulation. The pressure maintained on the gas in the annulus between the refrigerated vessel and the protective casing should be substantially above atmospheric pressure, e.g., 2 to 4 ounces or more above atmospheric pressure, and this can be accomplished by a regulator valve on the gas supply or can be accomplished by a bellows or piston in the casing wall to compensate for changes in atmospheric pressure and/or temperature.

There will normally be the inevitable leaks in the casing which, for most purposes, will obviate the necessity for a vent for the the pressure inside the annulus; however, it is usually preferred to have a safety relief valve connected to the annulus and set at some predetermined safe value to avoid rupturing the casing, in the case of the flexible membrane, as a result of malfunctioning of the regulator valve or in case of some other unforeseen emergency. Furthermore, the relief valve provides a means through which the air can be displaced with dry gas when the system is assembled and in case the system is opened for repairs or inspection.

Referring now to the drawing, FIGURE 1 is a schematic illustration of a barge 10 containing two vessels 11 and 12 for the transportation of a liquefied gas such as propane. The vessels 11 and 12 are shown as covered with blanket insulation 13 and 14 and sealed in a container formed of the hull 15 and the deck plate 16 of barge 10. Bulkheads indicated at 17 complete the enclosure of the vessels 11 and 12.

A supply of substantially anhydrous gas such as nitrogen, helium or carbon dioxide is maintained in cylinder 18 and gas is passed from the cylinder 18 via regulator valve 19, conduit 21 and conduits 22 and 23 to the space around vessels 11 and 12 and between the hull 15 and the deck 16 of barge 10. Pressure relief valve 24 is set to relieve the pressure in the space between the hull 15 and deck 16 of barge 10 in case of excessive build-up of pressure therein. Gas vapors are removed from the refrigerated tanks 11 and 12 via valved conduits 25 and 26, are compressed, cooled (in conventional refrigerating equipment not shown) and returned as liquid to vessels 11 and 12 via valved conduits 27 and 28. One conduit can be used where conduits 22 and 23 are shown or more than two conduits can be used as desired.

FIGURE 2 illustrates another method for encasing a refrigerated vessel which is particularly useful in situations where the vehicle or container for the refrigerated vessel does not lend itself to the pressurizing technique as described with reference to FIGURE 1. In FIGURE 2 a tank 30 is covered with solid insulation 31 which can be blanket type or block type insulation secured to the vessel by means of metal bands, cementing materials and the like, and the insulated tank is then encased in a membrane of flexible gas impervious material such as Mylar (trademark) fabric as indicated at 32. The flexible membrane is fastened to the insulation at intervals as indicated at 33 by an adhesive such as epoxy resin cement or by metal or fabric bands secured about the structure longitudinally. The dry gas is introduced to the space between the flexible membrane and the insulation via valved conduit 34. At intervals along the longitudinal length of the vessel the insulation is grooved circumferentially, as indicated at 35, to allow distribution of the gas across the whole envelope.

The maerials which are particularly suitable for the flexible, impervious membrane include polyethylene, Dacron (trademark), neoprene (trademark), Mylar (trademark), and the like.

The insulation can be conventional block or blanket type solid, porous insulation such as Styrofoam (trademark), glass wool, rock wool, cork and the like. Loose insulation such as expanded vermiculite, ground cork and the like can be used also in installations such as shown in FIGURE 1 wherein the refrigerated vessel is contained in a rigid casing. A virtue of the loose insulation is that conduits do not have to be insulated individually since they are submerged in the loose insulation fill.

The dry or substantially dry gas can be any inert gas such as nitrogen, carbon dioxide, helium or other noncombustible, noncorrosive, nonpoisonous gas which is available in dry form. The refrigerated vessel will usually be fabricated from a material having low notch sensitivity such as low carbon steels, nickel-containing steels, austenitic stainless steels, aluminum and the like.

It is a feature of the invention that a dry, inert gas from a separate source is used to maintain a positive pressure of dry, inert gas in the insulation. As atmospheric pressure and/or temperature changes, the excess gas is vented or additional gas is added as required to maintain the positive pressure on the insulation within the casing.

Variations and modifications are possible within the scope of the disclosure without departing from the spirit and scope of the invention.

That which is claimed is:

1. In a barge containing an insulated tank having a covering of solid porous insulation secured to its exterior surface for transporting volatile liquids at substantially atmospheric pressure and at a temperature below the boiling point of the liquid, the combination therewith of a substantially gas impervious flexible membrane enclosing said insulated tank and secured to said insulation at a plurality of points to provide a plurality of communicating passageways in the insulated space between the membrane and the tank; a supply of substantially anhydrous, inert gas; conduit means connecting said supply of gas and said insulated space; and regulator means connected to said space and said supply of gas to maintain gas pressure in said space above atmospheric pressure.

2. In a barge for transporting a liquefied gas at substantially atmospheric pressure and at a temperature below the boiling point of the liquid wherein the liquefied gas is contained in a closed tank, the combination therewith of solid porous insulation material secured to and covering said tank and having a circumferential groove in its outer surface; a flexible membrane encasing the insulated tank and secured to the insulation about the longitudinal axis of the tank at a plurality of intervals to provide a substantially gas tight covering with communicating passageways between the membrane and the insulation; a supply of substantially anhydrous, inert gas; means connecting said supply of gas to said passageways; regulator means connected to said supply of gas to maintain gas pressure in said passageways at a selected pressure above atmospheric pressure; and a relief valve connected to said passageways to vent gas when the pressure in the passageways rises above the said selected pressure.

References Cited in the file of this patent

UNITED STATES PATENTS

| | | |
|---|---|---|
| 1,878,317 | Picard | Sept. 20, 1932 |
| 1,936,059 | Kinson | Nov. 21, 1933 |
| 2,512,308 | Cooper | June 20, 1950 |
| 2,650,478 | Brown | Sept. 1, 1953 |
| 2,777,295 | Bliss et al. | Jan. 15, 1957 |
| 2,897,657 | Rupp | Aug. 4, 1959 |
| 2,927,437 | Rae | Mar. 8, 1960 |
| 3,031,856 | Wiedemann et al. | May 1, 1962 |

FOREIGN PATENTS

| | | |
|---|---|---|
| 888,247 | Great Britain | Jan. 31, 1962 |